3,822,287
PROCESS FOR PREPARATION OF SUBSTITUTED
3,4-(DIPHENYL)CHROMANS
James W. Bolger, Canoga Park, Calif., assignor to Rexall
Drug and Chemical Company
No Drawing. Continuation-in-part of abandoned application Ser. No. 817,142, Apr. 17, 1969. This application
June 8, 1972, Ser. No. 260,849
Int. Cl. C07d 7/24
U.S. Cl. 260—326.5 D     24 Claims

ABSTRACT OF THE DISCLOSURE

Substituted 3,4-diphenylchromans in *trans* configuration are obtained by a process wherein a 2,2-bis(lower alkyl)-3 - phenyl-4-(hydroxyphenyl)chromene is hydrogenated, providing a *cis*-2,2-bis(lower alkyl)-3-phenyl-4-(hydroxyphenyl)chroman which is reacted with a primary, secondary or tertiary lower haloalkylamine to form the corresponding *cis*-2,2-bis(lower alkyl)-3-phenyl-4-(amino or substituted aminoalkoxyphenyl)chroman, followed by the step of transforming the *cis* isomer to the *trans* configuration by means of a base-catalyzed rearrangement.

BACKGROUND OF THE INVENTION

This application is a continuation-in-part of my prior copending application for U.S. Letters Patent, Ser. No. 817,142, filed Apr. 17, 1969, now abandoned.

The preparation of compounds prepared by the process of this invention has been previously described in general terms, for example in U.S. Pat. 3,340,276 both *cis* and *trans* isomeric forms of these compounds being formed. It is suggested these can be separated on the basis of "physico-chemical differences." The report of Carney et al., J. Med. Chem. 9:516–520, 1966, shows obtaining pure *cis* and *trans* isomers of similar compounds by separate preparative techniques. However, the prior art does not describe the preparation of the pure *trans* isomers of these compounds free from *cis* isomers, nor does the prior art as far as is known suggest chemical conversion or rearrangement of the *cis* isomer to the *trans* isomer. It is believed to be novel, unobvious and unexpected that the *cis* isomers could be converted through the action of catalysts as described herein to pure *trans* isomer. The use of a specific class of catalysts to effect this transformation is the point of novelty of the present invention.

DETAILED DESCRIPTION OF THE INVENTION

This invention relates to a process for the preparation of *trans*-2,2-bis(lower alkyl)-3-phenyl - 4 - (substituted amino- or aminoalkoxyphenyl)chromans, and particularly to the step of transforming the *cis* isomers of these products to the *trans* configuration by means of a base-catalyzed rearrangement.

The process of the invention is illustrated by the following reaction sequence. The structural formulae are set forth in accordance with accepted practice to indicate isomeric forms.

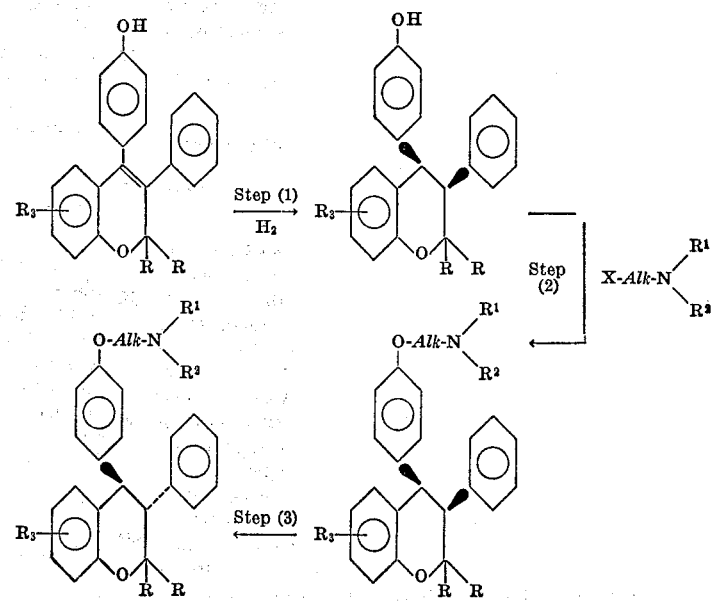

wherein R is lower alkyl, $R_3$ is lower alkoxy, lower alkyl, halogen or trifluoromethyl, Alk is lower alkylene, and in the group —$NR^1R^2$ the $R^1$ and $R^2$ substituents are independently hydrogen or lower alkyl, or, taken together with the nitrogen atom to which they are attached, form a 5- or 6-membered nitrogen-containing heterocyclic ring wherein one of the carbon atoms may be replaced by an oxygen atom, said heterocyclic ring being selected from the group consisting of pyrrolidino, morpholino, piperidino, piperazino, 4-lower alkylpiperazino and 4-phenylpiperazino, and X is halogen.

As used throughout this application, the terms "lower alkyl" and "lower alkoxy" embrace both straight and branched chain alkyl and alkoxy radicals, respectively, containing from 1 to 6 carbon atoms, for example, but without limitation, methyl, ethyl, n-propyl, isopropyl, n-butyl, tert-butyl, n-amyl, sec-amyl, n-hexyl, 2-ethylbutyl, 2,3-dimethylbutyl and the like in the case of "lower alkoxy," and the term "lower alkylene" embraces both straight and branched chain alkylene radicals containing from 2 to 6 carbon atoms, for example, but without limitation, ethylene (—$CH_2CH_2$—), n-propylene (—$CH_2CH_2CH_2$—)

isopropylene (—$CH_2CH(CH_3)CH_2$—), n-butylene (—$CH_2CH_2CH_2CH_2$—)

tert-butylene (—$CH_2C(CH_3)_2$—), n-amylene (—$CH_2CH_2CH_2CH_2CH_2$—)

n - hexylene (—$CH_2CH_2CH_2CH_2CH_2CH_2$—), 2 - ethylbutylene (—$CH_2CH(CH_2CH_3)CH_2CH_2$—), 2,3-dimethylbutylene (—CH$_2$CH(CH$_3$)CH(CH$_3$)CH$_2$—) and the like.

The trans-2,2-bis(lower alkyl)-3-phenyl-4-(substituted amino- or aminoalkoxyphenyl)chromans prepared by the process of this invention possess valuable pharmacological activity as post-coital anti-fertility agents; see, for example, U.S. Pats. 3,340,226, 3,340,277 and 3,535,344. A method for testing chemical compounds to establish their value as anti-fertility agents is described in J. Reproduction and Fertility, vol. 5, page 239 (1963). The cis isomers appear to have significantly lower or even no physiological activity for the stated purpose.

The process is particularly useful for compounds of high activity wherein R$_3$ is 7-methoxy.

Compounds wherein Alk is ethylene form a preferred subclass.

Another subclass of compounds are those wherein R$^1$ and R$^2$ are methyl or ethyl, and most preferred is methyl. Another preferred subclass is compounds wherein R$^1$ and R$^2$ together form a pyrrolidino ring.

The presently preferred compounds for preparation by the process of the invention are:

trans-2,2-dimethyl-7-methoxy-3-phenyl-4-[p-(β-pyrrolidinoethoxy)phenyl]chroman and
trans-2,2-diethyl-7-methoxy-3-phenyl-4[p-(β-pyrrolidinoethoxy)phenyl]chroman.

Broadly speaking, the process as shown is carried out to produce the cis isomers of the product. The product is then treated by the novel catalytic reaction of the invention to convert the cis isomer to the trans configuration.

Step (1) of the process is the hydrogenation of a 2,2-bis(lower alkyl)-3-phenyl-4 - (hydroxyphenyl)chromene. Such chromenes are conveniently prepared from 4-(acetoxyphenyl)-3-phenyl-coumarins by basic hydrolysis of the acetoxy group followed by reaction with an appropriate lower alkyl magnesium halide Grignard reagent.

The hydrogenation is carried out in the presence of a catalyst, for example platinum and palladium on carbon, nickel and the like. The presently preferred catalyst is palladium on carbon. An inert organic solvent, for example tetrahydrofuran, is generally used. Pressures of hydrogen between atmospheric and about 2000 p.s.i. are used, and preferably about 1000 p.s.i. Temperatures of about 15° to 100° C. are used. The product obtained is the correspondingly substituted cis-2,2-bis(lower alkyl) - 3 - phenyl - 4-(hydroxyphenyl)chroman.

Step (2) of the process is the reaction of the hydroxy group of the product of step (1) with an appropriate lower haloalkylamine of the formula

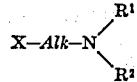

wherein X, Alk, R$^1$ and R$^2$ are as previously defined.

Among the suitable reactants that may be used in carrying out the process according to the present invention are unsubstituted (i.e. primary) lower haloalkylamines, for example 2-chloroethylamine, 3-bromo-propylamine and the like; secondary lower haloalkylamines, for example 2-chloro-N-methylethylamine, 3-bromo-N-ethylpropylamine and the like; tertiary lower haloalkylamines, for example 2-chloro-N,N-diethylethylamine, 3-bromo-N - ethyl - N-methylethylamine and the like; and the lower alkyl halides of saturated cyclic organic bases, for example N-(2-chloroethyl)-pyrrolidine, N-(2-chloroethyl)piperidine, N-(2-chloroethyl)-N'-phenylpiperazine, N-(3-chloropropyl)morpholine, N-(2-bromoethyl)piperidine, N-(2 - bromoethyl)piperazine, N-(2-chloroethyl)-N'-methyl piperazine and the like.

The reaction is carried out in an inert organic solvent medium, such as diethyl ketone, acetone, methanol, ethanol, isopropanol or mixtures thereof, dimethylformamide, dimethylsulfoxide and the like, in the presence of a base, for example potassium carbonate, sodium hydroxide, sodium hydride and the like, and at the reflux temperature of the solvent used.

The cis product of the reaction may be recovered by conventional procedures of isolation and purification, as the free base or as an acid addition salt (for example as the hydrochloride).

Step (3) is carried out in the presence of a basic catalyst. Through the use of the catalyst, the cis isomeric compound is transformed to the corresponding compound in the trans configuration by means of a base-catalyzed rearrangement. Only certain strong organometallic bases have been found to be useful. The rearrangement is carried out by treatment of the cis compound with an organo-lithium compound such as phenyl lithium or a lower alkyl lithium such as n-butyl lithium; or by treatment with an alkali metal alkoxide such as potassium tert-butoxide. The reaction is carried out in the presence of a potentiating solvent such as dimethyl sulfoxide, dimethylformamide and the like. The preferred treatment is with n-butyl lithium in dimethyl sulfoxide. The product of the reaction is preferably recovered as the free base and then optionally converted to one of its acid addition salts.

EXAMPLE 1

(a) cis-2,2-Dimethyl-4-(p-hydroxyphenyl)-7-methoxy-3-phenylchroman 2,2-Dimethyl-4-(p-hydroxyphenyl) - 7 - methoxy 3-phenyl-chromene (15 g.) was dissolved in 250 ml. of tetrahydrofuran. The resulting solution was hydrogenated over 7.5 g. of 5 percent palladium on carbon at 1000 p.s.i. and 70° C. for 12 hours. The reaction mixture was filtered free of catalyst and evaporated to dryness in vacuo. The residue was recrystallized from benzene-petroleum ether (30–60° C.) to give the desired product, M.P. 174–177° C.

(b) cis-2,2-Dimethyl-7-methoxy-3-phenyl-4-[p-(β-pyrrolidinoethoxy)phenyl]chroman hydrochloride The hydroxyphenylchroman from (a) (2.8 g., 0.0078 mole), N-(2-chloroethyl)pyrrolidine hydrochloride (2.0 g., 0.117 mole), ground anhydrous potassium carbonate (6.0 g., 0.9434 mole) and acetone (250 ml.) were refluxed together for 40 hours. The reaction mixture was filtered, and the filtrate was concentrated to an oil. The oil was taken up in diethyl ether, and the ether solution was washed with aqueous sodium hydroxide, then with water, and then dried over anhydrous magnesium sulfate. Treatment of the ether solution with hydrogen chloride yielded an oil which crystallized slowly. The solid product was collected and recrystallized from acetone-methanol-diethyl ether, m.p. 198–201° C.

Analysis: Calculated for C$_{30}$H$_{36}$NO$_3$Cl: C, 72.93; H, 7.35; N, 2.84; Cl, 7.18. Found: C, 73.05; H, 7.09; N, 3.09; Cl, 7.09.

EXAMPLE 2 cis-2,2-Dimethyl-7-methoxy-3-phenyl-4-[p-(β-pyrrolidinoethoxy)phenyl]chroman cis-2,2-Dimethyl-4-(p-hydroxyphenyl) - 7 - methoxy-3-phenylchroman (50 g., 0.13 mole), prepared as described in Example 1(a), and an aqueous solution of sodium hydroxide (13.9 g. in 40 ml. of water) was added to isopropanol (250 ml.). After stirring for 15 minutes to effect partial solution, N-(2-chloroethyl)pyrrolidine hydrochloride (23.5 g., 0.139 mole) was added, and the resulting mixture was stirred for four hours at 50° C. The reaction mixture was cooled and then diluted with 500 ml. of water and extracted twice with diethyl ether. The ether extract was washed with water and then extracted four times with aqueous 1 N hydrochloric acid. The acidified aqueous extract was made basic with 50 percent aqueous sodium hydroxide solution to yield the white solid product, m.p. 117.5–119° C.

EXAMPLE 3 trans-2,2-Dimethyl-7-methoxy-3-phenyl-4-[p-(β-pyrrolidinoethoxy)phenyl]chroman The cis compound of Example 2 (9.0 g.) and anhydrous dimethyl sulfoxide (100 ml.) were placed in a dried flask fitted with a stirrer and nitrogen sparge tube. n-Butyl lithium solution (20 ml., 1.6 m in hexane) was then added over about 10 minutes. Deep red color formed and then slowly faded to a dull red brown. There was some warming observed, but no cooling was required. After stirring for 1.5 hours the reaction mixture was decomposed with water (20 ml.). The resulting solution was further diluted with water (200 ml.), and then the product was extracted into diethyl ether (four 100 ml. ether extracts). The ether extract was washed twice with 50 ml. portions of water, dried over anhydrous sodium sulfate and then evaporated in vacuo. The resulting oil was triturated with diethyl ether-petroleum (30–60° C.) ether mixture to yield a white crystalline solid, m.p. ~70° C.

The solid was recrystallized from ether-petroleum (30–60° C.) ether, m.p. 99–101° C. (sinters ~50° C.).

Analysis: Calculated for $C_{30}H_{35}NO_3$: C, 78.74; H, 7.71; N, 3.06. Found: C, 78.74; H, 7.72; N, 3.02.

EXAMPLE 4 cis-2,2-Diethyl-7-methoxy-3-phenyl-4-[p-(β-pyrrolidinoethoxy)phenyl]chroman cis-2,2-Diethyl-4-(p-hydroxyphenyl)-7-methoxy-3-phenylchroman (7.1 g., 0.018 mole; m.p. 182–182.5° C.), prepared according to the method of Example 1(a), and a solution of sodium hydroxide (1.82 g. in 5 ml. of water) were added to isopropanol (33 ml.). After stirring for 15 minutes, N-(2-chloroethyl)-pyrrolidine hydrochloride (3.08 g.) was added, and the resulting mixture was stirred at 50° for four hours. To the cooled reaction mixture was then added 67 ml. of water. The produce precipitated after one additional hour of stirring, m.p. 130–131° C.

Analysis: Calculated for $C_{32}H_{39}NO_3$: C, 79.13; H, 8.09; N, 2.88. Found: C, 79.59; H, 8.21; N, 2.87.

EXAMPLE 5 trans-2,2-Diethyl-7-methoxy-3-phenyl-4-[p-(β-pyrrolidinoethoxy)phenyl]chroman hydrochloride Anhydrous dimethyl sulfoxide (80 ml.) and the cis compound from Example 4 (7.5 g., 0.015 mole) were placed in a dry flask with a stirrer and nitrogen sparge tube. n-Butyl lithium solution (16 ml., 1.6 m. in hexane) was then added over a 10 minute period. After stirring for 90 minutes, the reaction mixture was decomposed by adding 16 ml. of water. The mixture was then diluted further with water (160 ml.) and then extracted twice with diethyl ether. The ether extracts were washed with water, dried over anhydrous magnesium sulfate, treated with gaseous hydrogen chloride, stirred and cooled to give the trans product, m.p. 226–227° C.

Analysis: Calculated for $C_{32}H_{39}NO_3Cl$: C, 73.61; H, 7.72; N, 2.68; Cl, 6.79. Found: C, 73.59; H, 7.63; N, 2.57; Cl, 6.97.

cis, trans Isomer mixtures of substituted 3,4-diphenylchromans may be converted to substantially pure trans isomer by the process of step (3) of the invention.

Using the method of Example 5, the following known cis, trans isomer mixtures of substituted 3,4-diphenylchromans, prepared in accordance with the disclosure of U.S. Pat. 3,340,276 are converted to the corresponding pure trans isomer.

cis, trans 3-(4-methyl-phenyl)-4-{4-[2-(1-piperidino)ethyl]oxyphenyl}-chroman,
cis, trans 3-(4-methoxy-phenyl)-4-[-(2-N,N-dimethylaminoethyl)oxyphenyl]-chroman,
cis, trans 3-(4-chloro-phenyl)-4-[4-(2-N,N-diethylaminoethyl)oxyphenyl]-chroman,
cis, trans 3-(4-chloro-phenyl)-4-{4-[2-(1-pyrrolidino)ethyl]-oxyphenyl}-chroman,
cis, trans 7-chloro-4-[3-chloro-4-(2-N,N-diethylaminoethyl)oxyphenyl]-3-phenylchroman,
cis, trans 4-[4-(2-N,N-diethylaminoethyl)oxyphenyl]-7-methoxy-3-phenylchroman, and
cis, trans 5,7-dimethoxy-4-{4-[2-(4-methyl-1-piperazino)ethyl]oxyphenyl}-chroman.

What is claimed is:
1. A process for preparing substituted trans-3,4-(diphenyl)chromans of the formula

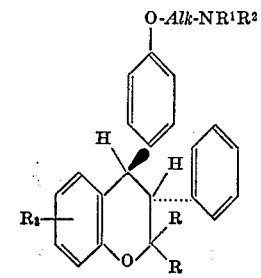

wherein R is lower alkyl, $R_3$ is lower alkoxy, lower alkyl, halogen or trifluoromethyl, Alk is lower alkylene, and in the group —$NR^1R^2$ the $R^1$ and $R^2$ substituents are independently hydrogen or lower alkyl, or, together with the nitrogen atom to which they are attached, form a 5- or 6-membered nitrogen-containing heterocyclic ring wherein one of the carbon atoms may be replaced by an oxygen atom, said heterocyclic ring being selected from the group consisting of pyrrolidino, morpholino, piperidino, piperazino, 4-lower alkylpiperazino and 4-phenylpiperazino; said process comprising
  (a) the catalytic hydrogenation of a substituted 3,4-(diphenyl)chromene compound of the formula

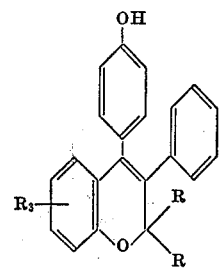

wherein R and $R_3$ are as defined above;
  (b) reaction of the so-formed substituted cis-3,4-(diphenyl)chroman product of step (a) with a compound of the formula $$X—Alk—NR^1R^2$$

wherein X is halogen, and Alk, $R^1$ and $R^2$ are as defined above, in the presence of a base, to form a compound of the formula

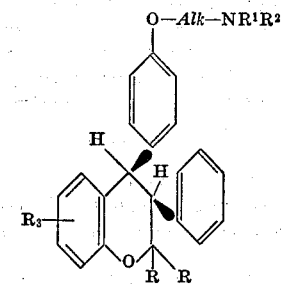

wherein R, $R_3$, Alk, $R^1$ and $R^2$ are as defined above; and
  (c) contacting the cis product of step (b) with a strongly basic catalyst selected from the group consisting of (1) organo-lithium compounds, and (2) alkali metal alkoxides, in the presence of an inert organic solvent, to catalyze rearrangement thereof wholly to the corresponding trans product.

2. A process for preparing substituted *trans*-7-lower alkoxy-2,2-di-lower alkyl-3,4-diphenylchromans of the formula

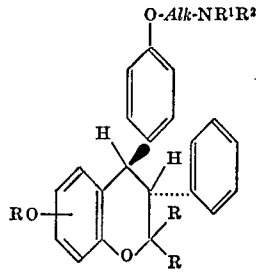

wherein R is lower alkyl, *Alk* is lower alkylene, and in the group —NR¹R² and R¹ and R² substituents are independently hydrogen or lower alkyl, or, together with the nitrogen atom to which they are attached, form a 5- or 6-membered nitrogen-containing heterocyclic ring wherein one of the carbon atoms may be replaced by an oxygen atom, said heterocyclic ring being selected from the group consisting of pyrrolidino, morpholino, piperidino, piperazino, 4-lower alkylpiperazino and 4-phenylpiperazino; said process comprising (a) the catalytic hydrogenation of 7-lower alkoxy-2,2-di-lower alkyl-3 - phenyl-4-(p-hydroxyphenyl)chromene;

(b) reaction of the so-formed *cis*-7-lower alkoxy-2,2-di-lower alkyl-3 - phenyl-4-(p-hydroxyphenyl)chroman with a compound of the formula X—*Alk*—NR¹R² wherein X is halogen, and *Alk*, R¹ and R² are as defined above, in the presence of a base, to form a substituted *cis*-7-lower alkoxy-2,2-di-lower alkyl-3,4-diphenylchroman of the formula

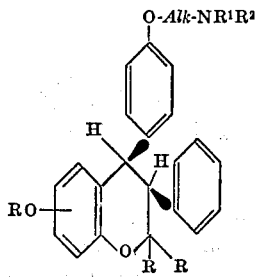

wherein R, *Alk*, R¹ and R² are as defined above; and (c) contacting said substituted *cis*-7-lower alkoxy-2,2-di-lower alkyl-3,4-diphenylchroman with a strongly basic catalyst selected from the group consisting of (1) organo-lithium compounds, and (2) alkali metal alkoxides, in the presence of an inert organic solvent, to catalyze rearrangement thereof wholly to the corresponding substituted *trans*-7-lower alkoxy-2,2-di-lower-alkyl-3,4-diphenylchroman.

3. Process according to claim 2 wherein said

X—*Alk*—NR¹R² is N-(2-chloroethyl)pyrrolidine.

4. Process according to claim 2 wherein said base-catalyzed rearrangement comprises treatment with n-butyl lithium.

5. The preparation of *trans*-2,2-dimethyl-3-phenyl-4-[p-(β-pyrrolidinoethoxy)phenyl]-7-methoxychroman according to claim 2.

6. The preparation of *trans*-2,2-diethyl-3-phenyl-4-[p-(β-pyrrolidinoethoxy)phenyl]-7-methoxychroman according to claim 2.

7. The process of claim 1 wherein the basic catalyst of step (c) is n-butyl lithium.

8. The preparation of *trans*-2,2-dimethyl-3-phenyl-4-[p-(β-pyrrolidinoethoxy)phenyl]-7-methoxychroman according to claim 4.

9. The preparation of *trans*-2,2-diethyl-3-phenyl-4-[p-(β-pyrrolidinoethoxy)phenyl]-7-methoxychroman according to claim 4.

10. In the process for producing *trans*-2,2-bis(lower alkyl)-3-phenyl-4-(substituted amino- or aminoalkoxyphenyl)chromans, the step which comprises contacting a compound of the formula

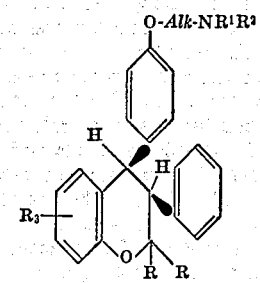

wherein R is lower alkyl, R₃ is lower alkoxy, lower alkyl, halogen or trifluoromethyl, *Alk* is lower alkylene, and in the group —NR¹R² the R¹ and R² substituents are independently hydrogen or lower alkyl, or, together with the nitrogen atom to which they are attached, form a 5- or 6-membered nitrogen-containing heterocyclic ring wherein one of the carbon atoms may be replaced by an oxygen atom, said heterocyclic ring being selected from the group consisting of pyrrolidino, morpholino, piperidino, piperazino, 4-lower alkylpiperazino and 4-phenylpiperazino, with a strongly basic catalyst selected from the group consisting of (1) organo-lithium compounds, and (2) alkali metal alkoxides, in the presence of an inert organic solvent, to catalyze rearrangement thereof wholly to the corresponding *trans* product of the formula

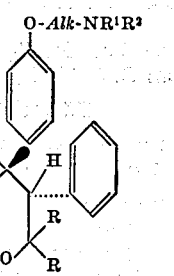

11. The step of rearrangement of *cis*-2,2-dimethyl-3-phenyl-4-[p-(β - pyrrolidinoethoxy)phenyl] - 7-methoxychroman to the *trans* isomer according to claim 10.

12. The step of rearrangement of *cis*-2,2-diethyl-3-phenyl-4-[p-(β-pyrrolidinoethoxy)phenyl] - 7 -methoxychroman to the *trans* isomer according to claim 10.

13. The step according to claim 10 wherein the strongly basic catalyst is n-butyl lithium.

14. The preparation of *trans*-2,2-dimethyl-3-phenyl-4-[p-(β-pyrrolidinoethoxy)phenyl] - 7 - methoxychroman by rearrangement according to claim 13.

15. The preparation of *trans*-2,2-diethyl-3-phenyl-4-[p-(β-pyrrolidinoethoxy)phenyl] - 7 - methoxychroman by rearrangement according to claim 13.

16. Process according to claim 1 wherein the strongly basic catalyst is selected from the group consisting of (1) phenyl lithium compounds, (2) lower alkyl lithium compounds, and (3) alkali metal alkoxides.

17. Process according to claim 2 wherein the strongly basic catalyst is selected from the group consisting of (1) phenyl lithium compounds, (2) lower alkyl lithium compounds, and (3) alkali metal alkoxides.

18. Step according to claim 10 wherein the strongly basic catalyst is selected from the group consisting of (1) phenyl lithium compounds, (2) lower alkyl lithium compounds, and (3) alkali metal alkoxides.

19. Step according to claim 1 wherein the strongly basic catalyst is selected from the group consisting of (1) phenyl lithium, and (2) lower alkyl lithiums.

20. Step according to claim 2 wherein the strongly basic catalyst is selected from the group consisting of (1) phenyl lithium, and (2) lower alkyl lithiums.

21. Step according to claim 10 wherein the strongly basic catalyst is selected from the group consisting of (1) phenyl lithium, and (2) lower alkyl lithiums.

22. Step according to claim 1 wherein the strongly basic catalyst is an alkali metal alkoxide.

23. Step according to claim 2 wherein the strongly basic catalyst is an alkali metal alkoxide.

24. Step according to claim 10 wherein the strongly basic catalyst is an alkali metal alkoxide.

References Cited
UNITED STATES PATENTS
3,535,344  10/1970  Irmscher et al. ____ 260—345.2

OTHER REFERENCES
Gilman, *Organic Chemistry* (adv.), 1938, vol. 1, pp. 375–9.

JOSEPH A. NARCAVAGE, Primary Examiner

U.S. Cl. X.R.
260—247.7 A, 268 BC, 293.58, 345.2, 999